Oct. 12, 1971  R. E. DILLBERG  3,611,644
MICROMETER FINISHING MACHINE
Filed March 11, 1970  2 Sheets-Sheet 1
FIG.—1
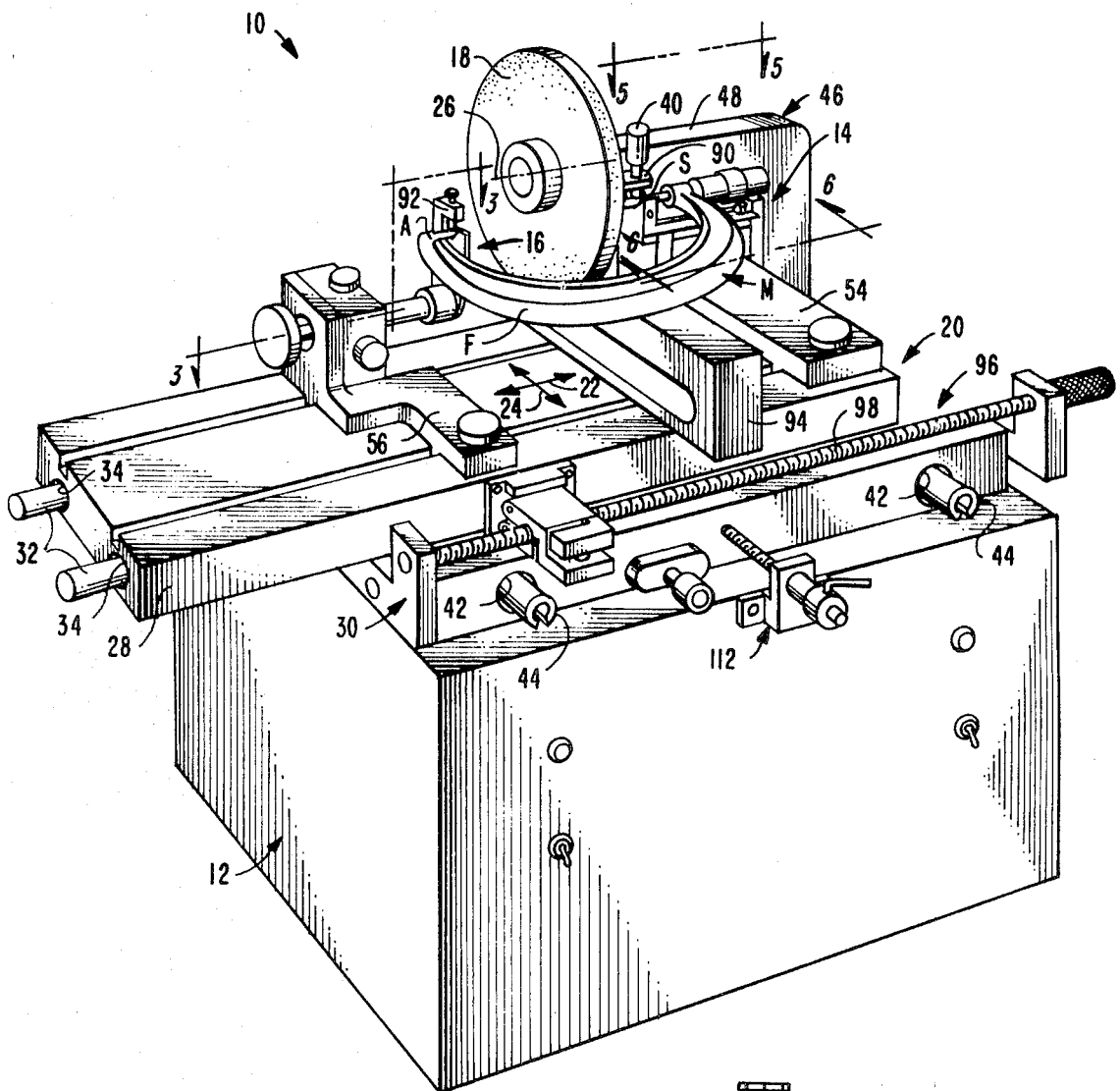
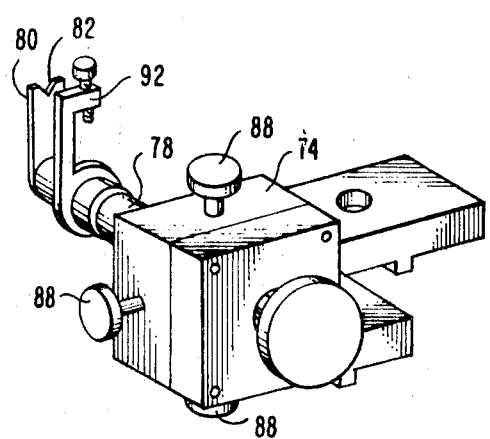
FIG.—2
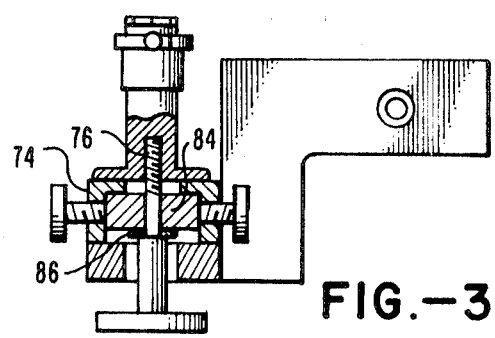
FIG.—3
INVENTOR.
RAYMOND E. DILLBERG
BY
*Boniard I. Brown*
ATTORNEY Oct. 12, 1971 R. E. DILLBERG 3,611,644
MICROMETER FINISHING MACHINE
Filed March 11, 1970 2 Sheets-Sheet 2
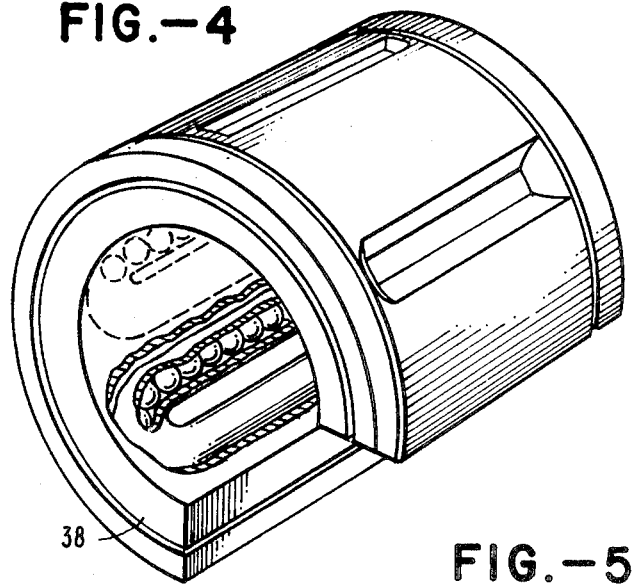
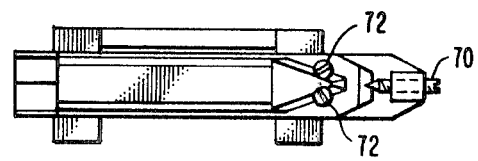
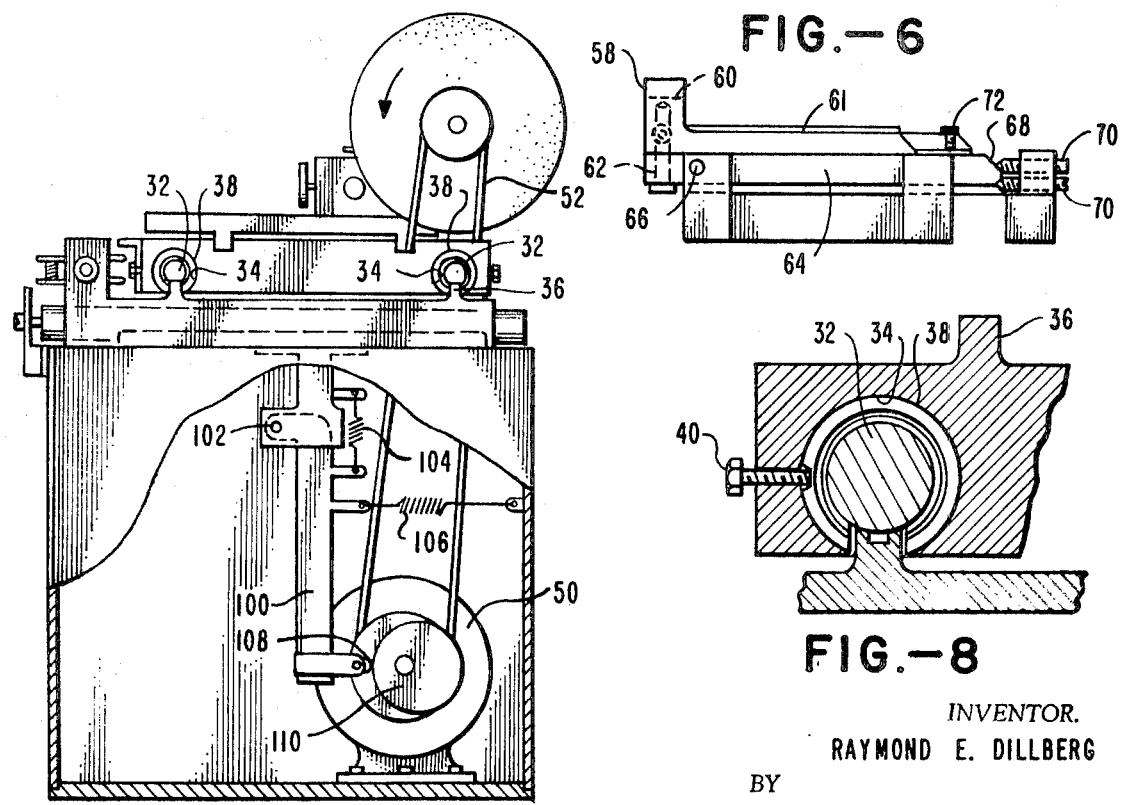
INVENTOR.
RAYMOND E. DILLBERG
BY
ATTORNEY

United States Patent Office 3,611,644
Patented Oct. 12, 1971

3,611,644
MICROMETER FINISHING MACHINE
Raymond E. Dillberg, Temple City, Calif., assignor to
Dill-Rich Company, San Gabriel, Calif.
Filed Mar. 11, 1970, Ser. No. 18,671
Int. Cl. B24b 7/02, 41/06
U.S. Cl. 51—122                                         9 Claims

ABSTRACT OF THE DISCLOSURE

A machine for finishing the end work engaging faces of a micrometer spindle and anvil by supporting the micrometer in finishing position wherein the anvil and spindle seat in micrometer supports in straddling relation to an abrasive finishing wheel, and moving the supports and wheel relative to one another along direction lines parallel to and normal to the wheel axis to first engage each micrometer face with the adjacent face of the wheel and then oscillate the engaged faces back and forth across the wheel face.

BACKGROUND OF THE INVENTION

Field of the invention

This invention relates generally to metal working machines and more particularly to a machine for finishing the end work engaging faces of a micrometer anvil and spindle.

Prior art

A micrometer of the type with which this invention is concerned has a bow frame with spaced arms mounting a movable spindle and an anvil, respectively. The spindle and anvil have a common axis and end work engaging faces normal to the axis. Associated with the spindle is a thimble which is rotatable to extend the spindle axially toward and retract the spindle axially away from the anvil. The axial spacing between the anvil and spindle faces is read from a graduated vernier scale.

In use, the micrometer spindle and anvil are placed in straddling relation to a work piece to be measured, and the spindle is adjusted axially toward the anvil until the spindle and anvil faces just connect the work piece. The work piece dimension along the micrometer axis is then read from the vernier scale. In order to provide an accurate reading, it is essential that the end work engaging faces of the anvil and spindle be finished or lapped so as to lie in planes precisely normal to the spindle-anvil axis.

SUMMARY OF THE INVENTION

The present invention provides a machine for finishing or lapping the spindle and anvil faces in this way. The machine has a frame, an abrasive finishing wheel on the frame, a pair of micrometer supports on the frame at opposite sides of the wheel for supporting a micrometer spindle and anvil with their common axis normal to the side faces of the wheel, and traversing means for effecting relative movement of the wheel and supports along direction lines parallel to and normal to the wheel axis. In the course of a typical micrometer finishing operation, the finishing wheel and micrometer are moved relative to one another to first engage one micrometer face, say the spindle face, with the adjacent face of the wheel and then oscillate the engaged micrometer face back and forth across the wheel face. This procedure is then repeated for the anvil.

According to one important feature of the invention, the micrometer supports are mounted on a traversing carriage means for movement relative to the finishing wheel along both the direction lines of wheel and support movement. This carriage means includes a main carriage which directly carries the micrometer supports and a support carriage which carries the main carriage. The support carriage is supported on the machine frame and the main carriage on the support carriage by means of ball bushings moving on support rods. These ball bushings are radially adjustable to receive the support rods with zero tolerance so as to provide precision support for the main carriage. Other important features reside in the carriage drive means which are arranged to effectively release the carriages automatically in response to an overload and in means for adjusting the micrometer supports to precisely align the latter on a common axis parallel to the rotation axis of the finishing wheel.

BRIEF DESCRIPTION OF THE DRAWINGS

FIG. 1 is a perspective view of a present micrometer finishing machine;
FIG. 2 is an enlarged perspective of one micrometer support;
FIG. 3 is a section through the support taken on line 3—3 in FIG. 1;
FIG. 4 is an enlarged perspective of a ball bushing used in the machine;
FIG. 5 is a section taken on line 5—5 in FIG. 1;
FIG. 6 is a section taken on line 6—6 in FIG. 1;
FIG. 7 is an end view of the machine; and
FIG. 8 is a section through one ball bushing and support rod.

DESCRIPTION OF THE PREFERRED EMBODIMENT

The drawings illustrate a micrometer finishing machine 10 according to the invention having a frame 12, a pair of micrometer supports 14 and 16 straddling an abrasive finishing wheel 18 in the axial direction, and traversing means 20 for effecting relative movement of the micrometer supports and finishing wheel along mutually perpendicular direction lines 22, 24 parallel to and normal to the wheel rotation axis 26, respectively. In the particular inventive embodiment illustrated, the traversing means 20 comprises a main carriage 28 mounting the micrometer supports 14, 16 and a support carriage 30 mounting the main carriage for movement along direction line 22 and mounted, in turn, on the frame 12 for movement along direction line 24.

According to one important feature of the invention, the main carriage 28 is mounted on the support carriage 30 and the support carriage is mounted on the frame 12 by ball bushings. In this regard, refer to FIG. 17 wherein 32 are support rods which extend through openings 34 in the main carriage parallel to the direction line 22 and are fixed to pedestal bars 36 rising from the support carriage through bottom slots of the rod openings. Each rod mounts at least a pair of ball bushings 38 which are fixed within opposite ends of the respective carriage rod opening 34 and are split to clear the support rod pedestal bar. Thus, the ball bushings support the main carriage 28 for virtually frictionless rolling movement along the bushing support rods 32 in a direction parallel to the direction line 22. Referring to FIG. 8, each ball bushing 38 is radially adjustable by a screw 40 threaded in the main carriage to provide the ball bushings with substantially a zero tolerance fit on the bushing support rods.

The support carriage 30 has openings 42 parallel to the direction line 24 receiving ball bushings 44. Extending through the ball bushings are support rods (not shown) which are mounted on the frame 12 in the same manner as the main carriage support rods 32. Accordingly, the ball bushings 44 support the carriage 30, and thereby also the main carriage 28, for virtually frictionless rolling movement along the bushing rods in a direction parallel to the direction line 24.

The abrasive finishing wheel 18 is carried by a wheel support 46 on the machine frame 12. This wheel support has an upper horizontal arm 48 which projects over the main carriage 28 to support the wheel in an elevated position over the carriage. As noted earlier, the wheel rotation axis parallels the direction line 22 of carriage movement. Turning to FIG. 7, the finishing wheel 18 is driven by a motor 50 through a belt drive 52.

The micrometer supports 14, 16 are located at axially opposite sides of the finishing wheel 18 and have mounting plates 54, 56 secured to the upper side of the main carriage 28 for adjustment lengthwise of the carriage along the direction line 22. On the upper side of mounting plate 54 is a V-block 58 having a V-groove 60 and an arm 61 parallel to the longitudinal axis of the groove. V-block 58 is attached by a pivot 62 to an arm 64 parallel to arm 61. Arm 64 is attached by a pivot 66 to the mounting plate 54. V-block is angularly adjustable in the vertical direction about the pivot 66 and in the horizontal direction about the pivot 62. The rear end 68 of arm 64 is tapered to engage set screws 70 which straddle the tapered end and are adjustable to position the V-block on its pivot 66. The rear end 70 of arm 61 is tapered to engage set screws 72 which straddle the tapered end and are adjustable to position the V-block on its pivot 62.

On the upper side of mounting plate 56 is a hollow housing 74 to which is secured, by a screw 76, a support arm 78. At the end of arm 78 is an upstanding plate 80 having a V-groove 82. Screw 76 extends through a thrust collar 84 within the housing 74 and has a washer 86 seating against the collar to clamp the support arm 78 firmly to the housing when the screw is tightened. When the screw is loosened, the thrust collar is adjustable laterally to adjust the support arm in any lateral direction by screws 88 on the four sides of the housing.

According to the present invention, the micrometer supports 14, 16 are adjusted relative to the main carriage 28 to align the support V-grooves 60, 82 on a common axis parallel to the finishing wheel rotation axis 26. The anvil A and spindle S of micrometer M to be worked are then placed in the micrometer supports with the spindle resting in the V-groove 60 and the anvil resting in the V-groove 82. The spindle and anvil are held in the V-grooves in any convenient way. The illustrated micrometer supports are equipped with hold downs 90 and 92 for this purpose. The micrometer frame F then rests on a frame support 94 on the main carriage 28.

In operation of the machine, the main carriage 28 is first moved endwise along direction line 22 to engage the end work engaging face of the micrometer spindle S as anvil A with the adjacent face of the finishing wheel 18 whose opposite side faces are disposed in planes normal to the wheel axis 26. The support carriage 30 is then reciprocated laterally along direction line 24 to oscillate the engaged micrometer face back and forth across the wheel face to finish or lap the micrometer face. The same procedure is then repeated for the other face.

These motions are imparted to the carriages 28, 30 by carriage drive means 96. Carriage drive means 96 include a lead screw 98 parallel to the direction line 22 for driving the main carriage 28 along the latter direction line. This lead screw is rotatable by hand and the main carriage is coupled to the screw by a split nut which may be separated to disenage it from the screw. Carriage drive means 96 also comprises a depending drive arm 100 pivoted at 102 to the underside of the support carriage 30 on a pivot axis normal to the direction line 24. A spring 104 resists swinging of this arm in one direction on the pivot. A spring 106 is connected between the arm and the machine frame 12 so as to urge the arm in the opposite direction on its pivot. On the lower end of the arm is a follower 108 engaging a cam 110 driven by the motor 50. The strength of the springs 104, 106 is such that rotation of cam 110 drives the support carriage 30, through its drive arm 100, in a reciprocating motion along direction line 24. If the carriage encounters an obstruction in either direction of its stroke, the support carriage 30 simply stops and the arm 100 merely swings on its pivot 102 against the action of springs 104, 106. A stop 112 is provided for limiting the rearward travel of the support carriage in FIG. 1.

What is claimed as new in support of Letters Patent is:

1. A finishing machine for a micrometer including a bow frame having spaced arms mounting in mutual coaxial relation a movable spindle and a fixed anvil with confronting axially presented work engaging faces, said machine comprising:

a machine frame, an abrasive finishing wheel rotatably mounted on said frame for turning on the central rotation axis of the wheel and having parallel axially presented working faces at opposite sides of the wheel in planes normal to said rotation axis, means for driving said wheel in rotation, a pair of micrometer supports on said frame at axially opposite sides of said wheel for seating and supporting said micrometer spindle and anvil with their common axis parallel to said rotation axes, traversing means for effecting relative movement of said wheel and micrometer supports along a first direction line parallel to said axes and a second direction line normal to said axes to selectively engage either micrometer face with the adjacent wheel face and cause relative movement of the engaged micrometer and wheel faces parallel to said faces to finish the engaged micrometer, and means for supporting said micrometer frame during said relative movement.

2. A micrometer finishing machine according to claim 1 wherein:

said traversing means comprise a main carriage mounting said micrometer supports, means supporting said carriage on said machine frame for independent carriage movement along said direction lines relative to said wheel, and means for independently driving said carriage along each direction line.

3. A micrometer finishing machine according to claim 2 wherein:

said carriage supporting means comprises a support carriage, first support rods on said machine frame parallel to one direction line, ball bushings mounting said support carriage on said rods for movement along said rods, second support rods on said support carriage parallel to the other direction line, and ball bushings mounting said main carriage on said second rods for movement along said second rods.

4. A micrometer finishing machine according to claim 3 wherein:

said carriage drive means comprise first manually operable means for driving said main carriage along said first direction line and second motor driven means for driving said support carriage in a reciprocating motion along said second direction line.

5. A micrometer finishing machine according to claim 4 wherein:

said first support rods extend normal to said axes and said second support rods parallel said axes, said manually operable means are operatively connected between said main carriage and support carriage, and said motor driven means are operatively connected between said machine frame and support carriage.

6. A micrometer finishing machine according to claim 5 wherein:

said motor driven means comprise an arm depending from the underside of said support carriage, means pivotally attaching the upper end of said arm to said carriage support on a pivot axis normal to the direction line of movement of said support carriage, means for exerting driving forces on the lower end of said arm alternately in opposite directions along the latter direction line, and means including a spring for resisting rotation of said arm on its pivot axis with sufficient force to transmit said driving forces to said support carriage under normal conditions while permitting said arm to pivot relative to said support carriage in response to an overload on the latter carriage.

7. A micrometer finishing machine according to claim 1 including:
means for adjusting said micrometer supports to align said common micrometer axis normal to said wheel face planes.

8. A micrometer finishing machine according to claim 7 wherein:
said micrometer supports comprise V-grooves for seating said micrometer anvil and spindle, respectively, and
said adjusting means comprise means for adjusting each micrometer support angularly to place the longitudinal axis of its V-groove parallel to said rotation axis, and means for adjusting one micrometer support laterally of said rotation axis to align the longitudinal axes of said V-grooves.

9. A micrometer finishing machine according to claim 8 wherein:
said micrometer supports comprise retaining means for retaining said micrometer anvil and spindle in seating engagement with said micrometer support grooves.

References Cited

UNITED STATES PATENTS

| 2,013,262 | 9/1935 | Wilsey | 51—217 X |
| 229,250 | 6/1880 | Hammond | 51—121 X |

FOREIGN PATENTS

| 902,443 | 1/1954 | Germany | 51—286 |

HAROLD D. WHITEHEAD, Primary Examiner

U.S. Cl. X.R.

51—217, 286